(12) United States Patent
Locke et al.

(10) Patent No.: US 6,491,797 B1
(45) Date of Patent: *Dec. 10, 2002

(54) METHODS OF OXIDIZING ORGANIC CONTAMINANTS IN AQUEOUS MEDIUMS USING CORONA INDUCED REACTIONS

(75) Inventors: Bruce R. Locke, Tallahassee, FL (US); Amit K. Sharma, Richland, WA (US); Wright C. Finney; Pedro G. Arce, both of Tallahassee, FL (US)

(73) Assignee: Florida State University, Tallahassee, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/461,238

(22) Filed: Jun. 5, 1995

Related U.S. Application Data

(63) Continuation of application No. 08/148,785, filed on Nov. 5, 1993, now abandoned.

(51) Int. Cl.[7] .............................................. C07B 63/00
(52) U.S. Cl. .............................. 204/158.2; 204/158.21; 204/165; 588/212; 588/227; 210/748
(58) Field of Search ....................... 204/158.2, 158.21, 204/165; 588/212, 227; 210/748

(56) References Cited

U.S. PATENT DOCUMENTS

| | | | |
|---|---|---|---|
| 4,695,358 A | | 9/1987 | Mizuno et al. ............. 204/174 |
| 5,043,080 A | * | 8/1991 | Cater et al. ................. 210/748 |
| 5,108,718 A | * | 4/1992 | Dummersdorf et al. ...................... 422/186.23 |
| 5,236,672 A | | 8/1993 | Nunez et al. .......... 422/186.04 |
| 5,277,773 A | | 1/1994 | Murphy ..................... 204/168 |

OTHER PUBLICATIONS

Goheen et al., "The Degradation of Organic Dyes by Corena Discharge," Proc. 2nd Int'l. Symp. Chem. Oxidation, 1992.*
Huff., "Prod. of Hydrogen Peroxide in Pulsed Streamer Corona . . . " FAMU/FSU Thesis, Apr. 30, 1993.*
Sharma, "High Voltage Pulsed Streamer Corona Discharges for the Removal of Organic Contaminants . . . " presented to Dept. Chem. Eng. FAMU/FSU College of Eng. (Apr. 1993).*
Davies, R.A. et al.: *J. Chemical Society,* 3595–3602 (1952).
Hickling, A. et al.: *J. Chemical Society,* 711–720 (1954).
Swallow, A.L.: "Radiation Chemistry of Organic Compounds," Pergamon Press, pp. 48–53 (1960).
Micic, O.I. et al.: IAEA–SM–194–402, pp. 233–239 (1975).
Hoigne, J.: IAEA–SN–194/401, pp. 219–232 (1975).
Hashimoto, S. et al: *Radiat. Phys. Chem.,* 13:107–113 (1979).
Klibanov, A.M. et al.: *Science,* 221:259–261 (Jul. 1983).
Mizuno, A. et al.: Conf. Record of IEEE–Ind. Appl. Society Ann. Meeting, pp. 1015, 1020 (Sep.–Oct. 1984).
Mizuno, A. et al.: Conf. Record of IEEE–Ind. Appl. Society Ann. Meeting, pp. 1215–1219 (Oct. 1984).

(List continued on next page.)

Primary Examiner—Dwayne Jones
Assistant Examiner—C. Delacroix-Muirheid
(74) Attorney, Agent, or Firm—Akerman Senterfitt & Eidson, P.A.

(57) ABSTRACT

A method for oxidizing an organic contaminant in an aqueous medium generates $H_2O_2$ in the aqueous medium through the use of a corona discharge procedure. A quantity of hydroxyl radicals is generated from the $H_2O_2$. An organic contaminant is oxidized in the aqueous medium by reacting the hydroxyl radicals with the organic contaminant, the oxidation being enhanced by methods for facilitating the generation of hydroxyl radicals.

23 Claims, 7 Drawing Sheets

OTHER PUBLICATIONS

Kanzaki, K. et al.: *Electroanal. Chem.*, 167:297–300 (1984).
Okamoto, K. et al.: *Bull. Chem. Soc. Jpn.*, 58:2015–2028 (1985).
Moon, J. et al.: Conf. Record of IEEE–Ind. Appl. Society Ann. Meeting, pp. 1205–1210 (1986).
Masuda, S. et al.: Conf. Record of IEEE–Ind. Appl. Society Ann. Meeting, pp. 1173–1182 (1986).
Clements, J.S. et al.: Conf. Record of IEEE–Ind. Appl. Society Ann. Meeting, 1183–1190 (1986).
Sudoh, M. et al.: *J. Chem. Eng. Jpn.*, 19(6):513–518 (1986).
Zepp, R.G.: *Environ. Sci. Technol.*, 21:443–450 (1987).
Clements, J. S. et al.: *IEEE Trans. Ind. Appl.*, 1A–23(2):224–235 (Mar./Apr. 1987).
Matthews, R.W.: *J. Phys. Chem.*, 91:3328–3333 (1987).
Kormann, C. et al.: *Environ. Sci. Technol.*, 22(7):798–806 (1988).
Barat, R.B. et al.: *Environ. Sci. Technol.*, 23:666–671 (1989).
Davis, A.P. et al.: *Wat. Res.*, 24(5):543–550 (1990).
Mopper, K. et al.: *Science*, 250:661–664 (Nov. 1990).
"Ozone in Water Treatment," eds. Langlais, B. et al., Lewis Publishers, pp. 46–48 (1991).
Petrier, C. et al.: *Environ. Sci. Technol.*, 26(8):1639–1642 (1992).
Goheen, S.C. et al.: "The Degradation of Organic Dyes by Corona Discharge," Proc. 2nd Int'l Symp. Chem. Oxidation, 1992.
Nickelsen, M.G. et al.: *Environ. Sci. Technol.*, 26:144–152 (1992).
Haag, W.R. et al.: *Environ. Sci. Technol.*, 26(5):1005–1013 (1992).
Zepp, R.G. et al.: *Environ. Sci. Technol.*, 26(2):313–319 (1992).
Nakamoto, S. et al.: *Wat. Res.*, 26(1):49–54 (1992).
Sharma, A.K.: "High Voltage Pulsed Streamer Corona Discharges for the Removal of Organic Contaminants From Aqueous Solutions," (A Master Thesis), presented to Dept. Chem. Eng. FAMU/FSU College of Eng., (Apr. 1993).
Grymonpré, D.R.: "The Effects of Carbon Particles on Pulsed Streamer Corona Discharge Characteristics," presented to Dept. Chem. Eng. FAMU/FSU Col. of Eng., (Sep. 1994).
Joshi, A.A. et al.: *J. Haz. Materials*, 41:3–30 (1995).
Grymonpré, D.R. et al.: "The Effects of Carbon on Aqueous Phase Pulsed Streamer Corona Oxidation of Organic Compounds," presented at 1995 Summer Nat'l Meet of AIChE (Boston, MA), paper 52c (Jul.–Aug. 1995).
Sharma, A.K. et al.: *Hazardous Waste & Hazardous Materials*, 10(2):209–219 (1993).
Jones, H.M. et al.: *J. Appl. Phys.*, 77(2):795–805 (Jan. 15, 1995).
Allen, A.O. et al.: *Decomposition of Water and Aqueous Solutions*, 56:575:586 (May 1952).
Hochanadel, C.J.: *Effects of Cobalt γ–Radiation on Water and Aqueous Solutions*, 56:587–593 (May 1952).
Peyton, G.R.: *Eniron Sci. Technol.*, 29:1710–1712 (1995).
Hoigné, J. et al.: *Water Res.*, 17:173–183, 185–194 (1983).
Andreozzi, R. et al.: *Wat. Res.*, 7:917–921 (1992).
Bogomaz, A.A. et al.: *Sov. Tech. Phys. Lett.*, 17(6):448–449 (Jun. 1991).
Luňák, S. et al.: *Czech. Chem. Commun.*, 48:3033–3040 (1983).

Mihailović, M.L. et al.: *Chemistry of the Hydroxyl Group*, ed. S. Patai, Interscience London, 1971.
Hoigné, J. et al.: *Water Research*, 10:377–386 (1976).
Bednar, J.: *Theoretical Foundations of Radiation Chemistry*, Kluwer Acad. Publ., Derdrecht, 1969.
Hughes, G.: *Radiation Chemistry*, Carendon Press, Oxford, 1973.
*Free Radicals*, vols. I & II, ed. Jay K. Kochi, Wiley NY.
Meek, J.M. et al.: eds. 1979. *Electrical Breakdown of Gases*, Wiley, New York, p. 486.
Remington, R.D.: *Statistics with Applications to the Biological & Health Sciences*, 1970, Prentice–Hall, Inc., New Jersey.
Freeman, G.R., ed., 1987, *Kinetics of Non–Homogenous Processes*, John Wiley, New York.
Spinks, J.W.T. et al.: *An Introduction to Radiation Chemistry*, John Wiley, New York.
Gallagher, T.J., 1975, *Simple Dielectric Liquid*, Clarendon Press, London.
Arnold, L., *Stochastic Differential Equation*, John Wiley, New York.
Hart, E.J.: *Ionizing Radiation in Aqueous Solutions of Formic Acid*, 56:594–599 (May 1952).
Gavalas, G.R.: *Chem. Eng. Sci.*, 21:133–141 (1966).
Gorman, A.A.: *J. Am. Chem. Soc.*, 111:1876–1877 (1989).
Behar, B. et al.: *Science*, 154:1012–1013 (Nov. 25, 1966).
Chatterjee, A. et al.: *Radiation Research*, 96:1–19 (1983).
Magee, J.L. et al.: *J. Phys. Chem.*, 82(20):2219–2226 (1978).
Gurol, M.D. et al.: *Wat. Res.*, 17(9):1173–1181 (1983).
Gurol, M.D. et al.: *Wat. Res.*, 21(8):895–900 (1987).
Mozumder, A. et al.: *Radiation Research*, 28:215–231 (1966).
Kupperman, A. et al.: *J. Chem. Physics*, 36(6):1427–1441 (Mar. 15, 1962).
Dorfman, L.M. et al.: *J. Chem. Physics*, 36(11):3051–3061 (Jun. 1, 1962).
Land, E.J. et al.: *Pulse Radiolysis Studies of Aqueous Phenol*, 1811.
Kupperman, A. et al.: *J. Chem. Physics*, 36(6):1412–1426 (Mar. 15, 1962).
Nesbitt, D.J. et al.: *J. Chem. Physics*, 77(4):2130–2143 (Aug. 15, 1982).
Singer, P.C. et al.: *Water Res.*, 17(9):1163–1171 (1983).
Bader, H. et al.: *Water Res.*, 15:449–456 (1981).
Chang, J.S. et al.: *IEEE Trans of Plasma Sci.*, 19(6):1152–1165 (Dec. 1991).
Penetrante, B.M.: Proc. of NATO Adv. Res. Workshop on Non–Thermal Plasma Techniques for Pollution Control, Cambridge, Engl., 1992.
Eliasson, B. et al.: *J. Phys. D: Appl. Phys.*, 20:1421–1437 (1987).
Peyrous, R. et al.: *J. Phys. Appl. Phys.*, 22:1658–1667 (1989).
Jones, H.M. et al.: *J. Phys. D: Appl. Phys.*, 28:178–188 (1995).
Sun, Y. et al.: *Environ. Sci. Technol.*, 27(2):304–310 (1993).
Pignatello, J.J.: *Environ. Sci. Technol.*, 26(5):944–951 (1992).
Luňák, S. et al.: *J. Photochem. Photobiol. A. Chem.*, 68:1–33 (1992).
Thornton, T.D. et al.: *J. Supercrit. Fluids*, 3:240–248 (1990).
Zuo, Y. et al.: *Science*, 260:71–75 (Apr. 2, 1993).

Huff, J.A.: *Prod. of Hydrogen Peroxide in Pulsed Streamer Corona Discharge Processes in Aqueous Solutions,* FAMU/FSU Thesis, Apr. 30, 1993.

Hart, E.J.: *Mechanism of Gamma–Ray Induced Oxidation of Formic Acid in Aqueous Solutions,* 73:68–73 (Jan. 1951).

Grosjean, D.: *J. Air Waste Manage. Assoc.,* 40:1397–1402 (1990).

Zhekul, V.G. et al.: *Sov. Phys. Tech. Phys.,* 28(1):4–8 (Jan. 1983).

Devins, J.C. et al.: *J. Appl. Phys.,* 52(7):4531–4545 (Jul. 1981).

Sharbaugh, A.H. et al.: *IEEE Trans. Electr. Insul.,* EI–13(4):249–276 (Aug. 1978).

Rakovskii, G.B. et al., *Sov. Phys. Tech. Phys.,* 29(2):216–217 (Feb. 1994).

Klimkin, V.F.: *Techn. Physics,* 38(5):431–433 (May 1993).

Klimkin, V.F.: *Sov. Tech. Phys. Lett.,* 16(2):146–148 (Feb. 1990).

Klimkin, V.F.: *Sov. Tech. Phys. Lett.,* 36(9):975–977 (Sep. 1991).

Klimkin, V.F.: *Sov. Tech. Phys. Lett.,* 35(6):735–736 (Jun. 1990).

Klimkin, V.F.: *Sov. Tech. Phys. Lett.,* 31(10):1223–1224 (Oct. 1986).

Klimkin, V.F. et al.: *Sov. Tech. Phys. Lett.,* 24(9):1067–1071 (Sep. 1979).

Yanshin, É.V. et al.: *Sov. Phys. Dokl.,* 19(2):95–96 (Aug. 1974).

Krivitsky, E.V.: *Sov. Phys. Tech. Phys.,* 36(1):4–7 (Jan. 1991).

Kuskova, N.I.: *Sov. Phys. Tech. Phys.,* 28(5):591–592 (May 1983).

Kosenskuv, V.M. et al.: *Sov. Phys. Tech. Phys.,* 32(10):1215–1217 (Oct. 1987).

Kuskova, N.I.: *Sov. Phys. Tech. Phys.,* 15(12):936–937 (Dec. 1989).

Joglekar, H.S. et al.: *Wat. Res.,* 25(2):135–145 (1991).

Peral, J. et al.: *J. Photochem. & Photobiol. A: Chem.,* 44:209–217 (1988).

Paretzke, H.G. et al.: *J. Chem. Phys.:* 84(6):3183–3188 (Mar. 15, 1986).

Fenneman, D.B.: *J. Appl. Phys.,* 53(12):8961–8968 (Dec. 1982).

Venkatadri, R. et al.: *Haz. Waste & Haz. Mat.,* 10(2):107–149 (1993).

Pimblott, S.M.: *J. Phys. Chem.,* 96:4485–4491 (1992).

Pimblott, S.M. et al.: *Radiat. Res.,* 122:12–23 (1990).

LaVerne, J.A. et al.: *J. Phys. Chem.,* 95:3196–3206 (1991).

LaVerne, J.A. et al.: *J. Phys. Chem.,* 97:3291–3297 (1993).

Jonah, C.D. et al.: *Radiat. Phys. Chem.,* 34(1):145–156 (1989).

Green, N.J.B. et al.: *Radiat. Phys. Chem.,* 34(1):105–114 (1989).

Ollis, D.F. et al.: *Environ. Sci. Technol.,* 25(9):1523–1529 (1991).

Wong, P. et al.: *Can. J. Chem.,* 55:1890–1898 (1977).

Clifford, P. et al.: *J. Phys. Chem.,* 86:1318–1321 (1982).

Bergsma, J.P. et al.: *J. Chem. Phys.,* 86(3);1356–1376 (Feb. 1987).

Zaider, M. et al.: *Radiat. Res.,* 100:245–156 (1984).

Chatterjee, A.: Chapter I, *Radiation Chemistry: Principles and Applications,* eds. Farhataziz & M.A.J. Rodgers, VCH Publishers 1987.

Klassen, N.V.: Chapter 2, *Radiation Chemistry: Principles and Applications,* eds. Farhataziz & M.A.J. Rodgers, VCH Publishers 1987.

Hummel, A.: Chapter 4, *Radiation Chemistry: Principles and Applications,* eds. Farhataziz & M.A.J. Rodgers, VCH Publishers 1987.

Magee, J.L. et al.: Chapter 5, *Radiation Chemistry: Principles and Applications,* eds. Farhataziz & M.A.J. Rodgers, VCH Publishers 1987.

Buxton, G.V.: Chapter 10, *Radiation Chemistry: Principles and Applications,* eds. Farhataziz & M.A.J. Rodgers, VCH Publishers 1987.

Swallow, A.J.: Chapter 11, *Radiation Chemistry: Principles and Applications,* eds. Farhataziz & M.A.J. Rodgers, VCH Publishers 1987.

\* cited by examiner

Corona Induced Reactions:

$$H_2O \xrightarrow{k_{OH\bullet}} H\bullet + OH\bullet$$

$$H_2O \xrightarrow{k_{H_2O_2}} 1/2 H_2O_2 + 1/2 H_2$$

$$H_2O \xrightarrow{k_{e^-_{aq}}} H_2O^+ + e^-_{aq}$$

*FIG. 1b*

Propogation Reactions:

$$H\cdot + O_2 \longrightarrow HO_2^\cdot$$
$$H\cdot + H_2O_2 \longrightarrow H_2O + OH\cdot$$
$$OH\cdot + H_2O_2 \longrightarrow H_2O + HO_2^\cdot$$
$$H_2O^+ + H_2O \longrightarrow OH\cdot + H_3O^+$$
$$e_{aq}^- + OH\cdot \longrightarrow OH^-$$
$$e_{aq}^- + H\cdot \xrightarrow{H_2O} OH^- + H_2$$
$$e_{aq}^- + H_2O_2 \longrightarrow OH\cdot + OH^-$$
$$e_{aq}^- + H_2O \longrightarrow H\cdot + OH^-$$

*FIG. 1c*

Termination Reactions:

$$H\cdot + OH\cdot \longrightarrow H_2O$$
$$2OH\cdot \longrightarrow H_2O_2$$
$$2HO_2^\cdot \longrightarrow H_2O_2 + O_2$$
$$H\cdot + HO_2^\cdot \longrightarrow H_2O_2$$
$$2H\cdot \longrightarrow H_2$$
$$HO_2^\cdot + OH\cdot \longrightarrow H_2O + O_2$$
$$H_3O^+ + OH^- \longrightarrow 2H_2O$$

*FIG. 1d*

METHODS OF OXIDIZING ORGANIC CONTAMINANTS IN AQUEOUS MEDIUMS USING CORONA INDUCED REACTIONS

This is a continuation Ser. No. 08/148,785 filed on Nov. 5, 1993, now abandoned.

FIELD OF THE INVENTION

The present invention relates to oxidation of organic contaminants in aqueous mediums using corona induced reactions. More particularly, the present invention relates to the use of a source or means other than oxygen, such as iron, in a corona reactor to facilitate the production of hydroxyl radicals from hydrogen peroxide ($H_2O_2$) generated by corona discharges in the aqueous medium to significantly enhance the oxidation of organic contaminants in the aqueous mediums. In addition, the present invention relates to the use of such sources or means in combination with oxygen in corona discharge procedures to even further oxidize organic contaminants in aqueous mediums.

BACKGROUND

A normal corona discharge is formed when dc or ac high voltage is applied between a non-uniform electrode geometry in a fluid dielectric. An electric corona has a three-dimensional discharge pattern that displays highly localized positive or negative space charge waves. These waves constitute the active region that propagates due to avalanches of electrons present in the high electric field. The electron avalanches are triggered by a photonization mechanism that provides secondary seed electrons. A region of weakly ionized plasma, known as the "passive region," remains along the track of the wave. This region provides the path for the current flow from the high voltage electrode. This current flow provides energy for the advancement of the corona.

Pulsed streamer corona technology uses high voltage pulses with very short width, approximately 100–1000 ns. This unique characteristic produces a corona that differs markedly from normal continuous discharge (dc corona), ac discharge, and long-pulse (~1 ms)* corona discharge. In the past, a pulsed streamer corona discharge has been used for treating gas phase pollutants. See, Clements, I. S. et al.: *IEEE Transactions Ind. Appl.*, IA-(23):224 (1987). In the gas phase, pulsed streamer corona was believed to be much more effective at promoting the reactions leading to desulfurization and dentrification than, for example, electron beam processes. See, Clements, I. S. et al.: *IEEE Transactions Ind. Appl.*, IA-(23):224 (1987). This was believed to be attributed to the more efficient production of hydroxyl radicals using pulsed stream corona. In addition, the work on pulsed streamer corona discharge in aqueous solutions with oxygen gas continuously bubbled through the solution has demonstrated the production of large amounts of ozone. See, Clements, I. S. et al.: *IEEE Transactions Ind. Appl.*, IA-(23):224 (1987).

The use of positive pulsed streamer corona for air pollutant treatment has been demonstrated for a number organic and inorganic toxins. U.S. Pat. No. 4,695,358 to Mizuno et al. discloses a method for converting sulfur dioxide and/or nitrogen oxide gases to acid mist and/or particle aerosols in which the gases are passed through a streamer corona discharge zone having electrodes of a wire-cylinder or wire-plate geometry.

Moreover, the use of positive pulsed streamer corona for air pollutant treatment has been demonstrated for a number of organic and inorganic toxins. See Clements, J. S. et al.: in Conf. Record of the IEEE-Indust. Appl. Soc. Ann. Meeting, pp. 1183–1190 (1986); Mizuno A. et al.: Use of an Electron Beam for Particle Charging in: Conference Record of the IEEE-Indus. Appl. Doc. Ann. Meeting. pp 1215–1219. Chicago, Ill. (October 1984); Masuda et al.: Control of $NO_X$ by Positive and Negative Pulsed Corona Diarges. Conference Record of the IEEE Indust. App]. Soc. Ann. Meeting, pp. 1173–1182 Denver, Colo. (1986); Moon, et al.: High Efficiency Ozone Generation Using A Helical Strip-Line Electrode and A Fast Rising Pulse Voltage. Conference Record of the IEEE Indust. Appl. Soc. Ann. Meeting. pp 1205–1210. Denver, Colo. (1986); and Chang, J. S., et al.: *IEEE Transactions on Plasma Sci.*, 19(6):1152 (1991). However, in aqueous phase systems, except for the work of Clements, I. S. et al.: *IEEE Transactions Ind. Appl.*, IA-(23):224 (1987), there has been no systematic investigation of pulsed corona in aqueous systems. Other processes that have been used to treat aromatic compounds include the aqueous-phase radiation treatment of benzene and alkyl-substituted benzenes, Nickelsen, N. G. et al.: *Environ. Sci. Technol.*, (26):144 (1991), and anthraquinone dye, Clements, I. S. et al.: *IEEE Transactions Ind. Appl.*, IA-(23):224 (1987), using electron beams and the use of cobalt gamma radiation to treat solutions containing phenol, Micic, O. I., et al.: Radiation Chemical Destruction of Phenol in Aqueous Solution, Radiation for a Clean Environment, International Atomic Energy Agency, Vienna, Austria, IAEA-SN-1194, 233–239 (1975). Clements, I. S. et al.: *IEEE Transactions Ind. Appl.*, IA-(23):224 (1987), have shown that pulsed corona discharges in aqueous solutions with oxygen bubbling through high voltage needle electrodes produces large amounts of ozone that can, in turn, lead to the decolorization of dyes.

The conventional mechanisms by which organic contaminants are degraded are quite varied. For example, molecular ozone can selectively react with contaminants through cycloaddition, electrophilic reaction, and nucleophilic reaction with unsaturated aromatic and aliphatic species. See Langlais, B. et al.: eds., Ozone in Water Treatment, Applications and Engineering, Lewis Publishers, Chelsea, Mich. (1991). In addition, ozone can lead to the formation of hydroxyl radicals. These radicals are highly reactive with a broad range of organic materials, Haag, W. R. et al.: *Environ. Sci. Technol.*, (26):1005 (1992), and they are generally considered crucial for the breakdown of most organic waste contaminants. Hydroxyl radicals are also formed in photocatalytic reactions of hydrogen peroxide, Zepp, R. G. et al.: *Environ. Sci. Technol.*, (26):313 (1992), nitrates, Zepp, R. G. et al.: *Environ. Sci. Tech.*, (21):443–450 (1987), nitrites, Mopper, K. et al.: Science, (250):662 (1990), and semiconductor surfaces, Korman, C. et al.: *Environ. Sci. Technol.*, (22):798–806 (1988); Matthews, R. W.: *J. Phys. Chem.*, (91):3328–3333 (1987); and Davis, A. P. et al.: *Wat. Res.*, (24):53–550 (1990). Photocatalytic processes have also been investigated for the removal of aqueous waste containing metals, such as silver, gold, mercury, cadmium, chromium, copper, nickel and platinum, alone and in combination with organic waste. The effectiveness of most of the above oxidation methods is attributed to the formation of hydroxyl radicals, however, the major problems with sustaining these reactions are radical scavenging by carbonate and other ions in solution and the low selectivity of the reactions.

Another possible way of removing organic contaminants from wastewater is by corona-induced flocculation. This is similar to an alternative treatment strategy proposed for phenol-containing wastes that utilizes hydrogen peroxide and the enzyme peroxidase to polymerize the phenol into colloidal size particles that can be removed by sedimentation or filtration. See, Klibanov, A. N. et al.: *Science*, (221) :259–261 (1983) and Nakamoto, S. et al.: *Wat. Res.*, (26) :49–54 (1992). Indeed, radiation processes are commonly used to initiate free radical polymerization for the production of synthetic polymers, and similar radical mechanisms may occur in aqueous corona systems under properly controlled solution conditions.

Ozone is known to also have a strong effect on coagulation or flocculation of organic matter. However, the mechanisms by which ozone facilitate coagulation are not well understood. Indeed there may be several different mechanisms involved that depend upon the characteristics of the waste. See, Langlais, B. et al.: eds., Ozone in Water Treatment, Applications and Engineering, Lewis Publishers, Chelsea, Mich. (1991).

A number of alternative processes have been considered and studied for the degradation of organic contaminants in aqueous solutions. See, Ollis, D. F. et al.: *Environ. Sci. Technol.*, 25(9):1523 (1991). These include oxidation processes such as UV photolysis, direct ozonation, Langlais, B. et al.: eds., Ozone in Water Treatment, Applications and Engineering, Lewis Publishers, Chelsea, Mich. (1991), photo-catalysis, Davis, A. P. et al.: *Wat. Res.*, (24):53–550 (1990) and Okamoto, K-I. et al.: *Bull. Chem. Soc. Jpn*, (58):2015 (1985), electron beams, Nickelsen, N. G. et al.: *Environ. Sci. Technol.*, (26):144 (1991), and various combinations of these methods. Other processes may include microwave plasma reduction, Barat, R. B. et al.: *Environ. Sci. Technol.*, (23):666 (1989), ultrasonication, Petrier, C. et al.: *Environ. Sci. Technol.*, (26):1639 (1992), and radiation initiated processes such as gamma radiation from cobalt sources, Micic, O. I., et al.: Radiation Chemical Destruction of Phenol in Aqueous Solution, Radiation for a Clean Environment, International Atomic Energy Agency, Vienna, Austria, IAEA-SN-1194, 233–239 (1975) and Hoigne, J.: Radiation for a Clean Environment, International Atomic Energy Agency, Vienna Austria, 219–232 (1975).

Despite advances in the above techniques there still remains a need to develop more efficient, practical, and robust methods to treat the vast quantities of organic waste released to the environment from a wide variety of processes. It is also crucial to develop a fundamental understanding of the chemical reaction pathways involved in the breakdown of organic species in order to develop means of controlling and facilitating these reactions in order to design and operate systems where these reactions can be carried out.

SUMMARY OF THE INVENTION

In brief, the present invention alleviates certain of the aforementioned problems and shortcomings of the present state of the art through the discovery of novel methods for degrading organic molecules or contaminants in aqueous mediums. Generally speaking, the methods of the present invention are based upon the realization that corona-induced reactions when supplemented are very effective at breaking down organic contaminants in aqueous mediums. More particularly, the methods of the instant invention are premised upon the realization that sufficient quantities of hydroxyl radicals can be generated from hydrogen peroxide ($H_2O_2$) produced by corona discharge procedures, and preferably pulsed streamer corona discharge procedures, through the use of an effective source or means, other than oxygen, in a corona reactor for oxidizing the organic contaminants in the aqueous mediums to end products, such as $CO_2$, $H_2O$ and other possible constituents, like HCl. It should be understood that the type of end products generated from the oxidation in accordance with the methods of the present invention will, of course, be dependent upon the types of organic contaminants present in the aqueous mediums.

In accordance with the present invention, it has been surprisingly discovered that the breakdown of the organic contaminants present in the aqueous mediums can be significantly enhanced through the use of corona discharge procedures in combination with such sources or means, other than oxygen, which are capable of facilitating the generation of hydroxyl radicals from the $H_2O_2$ produced in the aqueous mediums by the corona discharge processes. Exemplary of such sources or means includes transition metals, such as iron (ferrous or ferric), manganese, copper, cobalt, unanium, rhenium, and other transition metals, elemental iron, photocatalysts, such as titanium dioxide and silicon dioxide, cadmium sulfide, manganese oxide, magnesium oxide, lead oxide and zinc oxide. It should of course be appreciated that while iron is particularly preferred, any source or means, other than oxygen, which is capable of producing hydroxyl radicals is contemplated by the instant invention.

It has also been found in accordance with the methods of the present invention that when oxygen is continuously added to the aqueous mediums in a corona reactor in combination with such sources or means, ozone is formed in-situ by, for example, the pulsed streamer corona, and the breakdown of the organic molecules or contaminants in the aqueous mediums is even further enhanced.

It should therefore be appreciated that the novel and unique methods of the present invention are effective in breaking down organic contaminants, such as aromatics, like phenol, benzene, toluene, ethylbenzene, xylene, anthracene and phenanthracene, halogenated hydrocarbons, like trichloroethylene, tetrachloroethylene, perchloroethylene and other chlorinated and brominated hydrocarbons, nitrogen-containing compounds, such as nitrobenzene and cyanide, sulfur-containing compounds, such as mercaptans and aliphatic compounds, like hydrocarbons, alcohols and carboxylic acids, in aqueous solutions, such as waste waters.

DESCRIPTION OF THE FIGS

With reference to the accompanying FIGS. which are illustrative of certain embodiments within the scope of this invention:

FIGS. 1(*a*), (*b*), (*c*) and (*d*) disclose diagrams of chemical reactions and/or transport phenomena. More particularly, FIG. 1(*a*) illustrates a diagram of chemical reactions and transport phenomena occuring in gas/liquid corona treatment processes, FIG. 1(*b*) illustrates corona-induced chemical reactions, FIG. 1(*c*) illustrates propagation reactions, and FIG. 1(*d*) illustrates termination reactions;

Figure 4A:
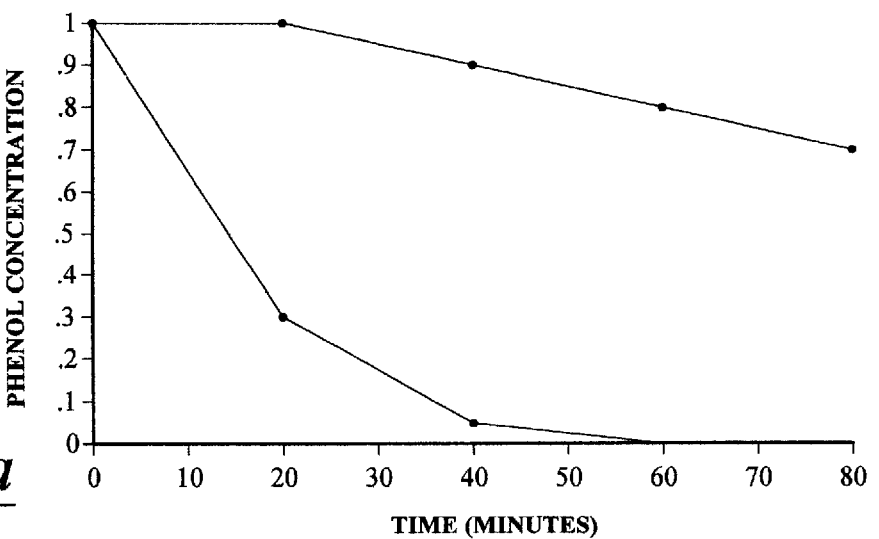
Figure 4B:
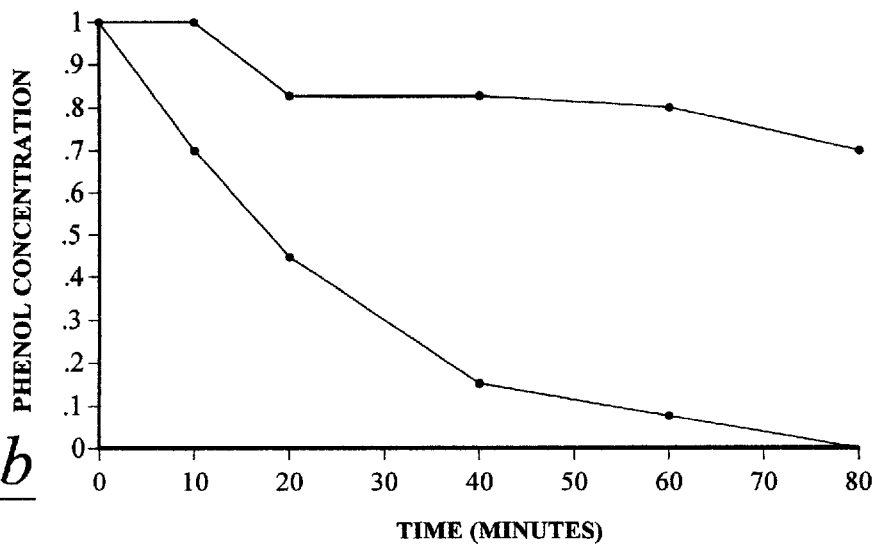
Figure 4C:
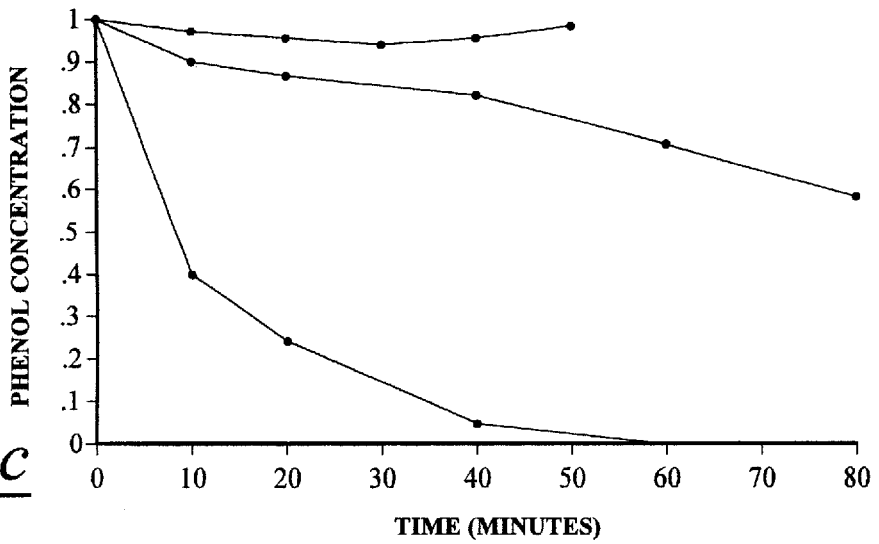

FIGS. 4(*a*), (*b*) and (*c*) illustrate the breakdown of phenol during corona procedures in the presence and absence of oxygen. More particularly, FIG. 4(*a*) shows phenol breakdown at pH 3.98 without (+) and with oxygen (*), FIG. 4(*b*) shows phenol breakdown at pH 7.00 without (+) and with oxygen (*), and FIG. 4(*c*) shows phenol breakdown at pH 9.3 without (+) and with oxygen (*). Control without corona is shown by x.

Figure 5A:
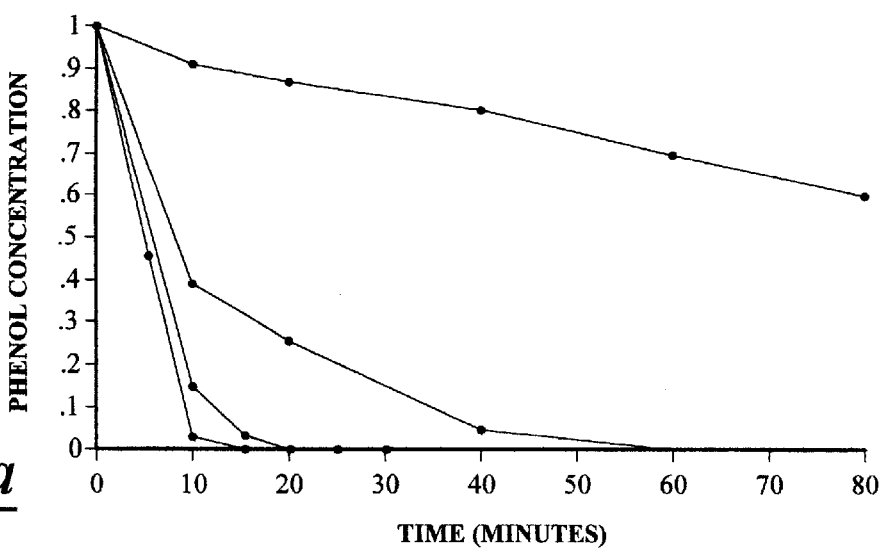
Figure 5B:
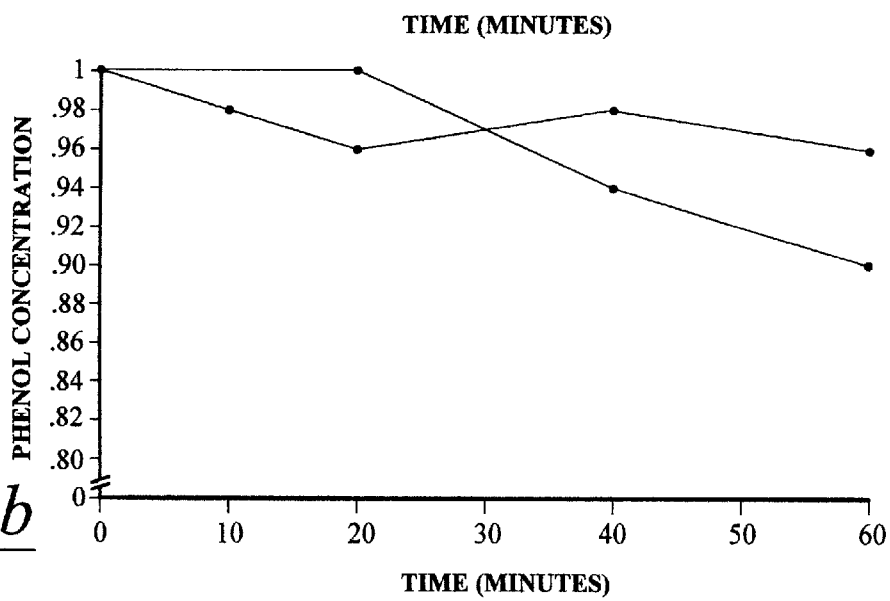

FIGS. 5(a) and (b) illustrates the breakdown of phenol during corona procedures in the presence of iron ($Fe^{++}$) with and without oxygen and in the presence of phosphate and borate buffer, respectively. More particularly, FIG. 5(a) illustrates the effects of iron addition at low pH with (o) and without (x) oxygen addition. Shown for reference is the data from FIG. 4(a). FIG. 5(b) illustrates the effect of phosphate (*) and borate (+) buffer on phenol breakdown.

It will be understood that the particular FIGS. embodying the present invention are shown by way of illustration only and not as limitations of the present invention. The principles and features of this invention may therefore be employed in various and numerous embodiments without departing from the scope of the invention.

DETAILED DESCRIPTION OF THE INVENTION

By way of illustrating and providing a more complete appreciation of the present invention and many of the attendant advantages thereof, the following detailed description is given concerning the novel methods of the present invention which concern the degradation of organic contaminants in aqueous mediums, such as wastewaters, via corona induced reactions, and preferably pulsed streamer corona discharge procedures.

In the context of this disclosure, the following terms shall be defined as follows unless otherwise stated:

"Corona" refers to an electrical glow adjacent to the surface of a high voltage conducting electrode within a non-uniform electric field.

"Corona discharge" refers to the ionic and electronic emission from a high voltage corona, characterized by the formation and flow in an electric field between two or more electrodes of positive ions, negative ions, and electrons.

"Streamer corona discharge" refers to a filamentous, normally short-lived electronic pathway or discharge that triggers an electrical breakdown (spark) between two asymmetrical electrodes under a high voltage tension.

"Pulsed streamer corona discharge" refers to a temporally stable, long, brushlike type of streamer corona having a large electron (not ion) component that is produced by repetitively applying a series of very short duration (200–2000 ns) high voltage pulses to an asymmetrical electrode geometry.

In the practice of the invention, a streamer corona discharge zone defined by spaced electrodes in a point-to-plane geometry is utilized. Other embodiments, such as wire-to-cylinder or wire-to-plane geometries may be utilized. The pulsed streamer corona discharge is produced by a rotating spark gap high voltage pulsed power supply, capable of supplying the reactor discharge electrode with, in this case, high voltage (25–40 kV), short duration (200–2000 ns), fast rise time (20–100 ns), repetitive (60 Hz), electrical pulses.

One unique feature of the pulsed streamer corona discharge technology used in accordance with the present invention is that it uses a very short pulse width (approximately 1000 ns). This characteristic produces a corona that differs markedly from normal continuous discharge (dc corona), ac discharge, and long pulse corona discharge. One important consequence of the the brief duration of the pulse is that it minimizes power wasted on ionic migration because the mobility of ions is much less than that of electrons. Energetic electrons produce free radicals; ions do not contribute to free radical formation. Thus, the use of pulsed streamer corona is believed to result in lower operating and capital costs of the methods of the present invention. However, it should be understood that any effective pulse width, such as 100–1000, may be used and contemplated by the methods of the present invention.

The use of corona discharge and in particular pulsed streamer corona discharge, in combination with a source or means, other than oxygen, in accordance with the methods of the present invention is effective at breaking down organic contaminants, such as phenol, in aqueous mediums in, for example, an isothermal batch reactor and in a semi-batch reactor. In particular, it is believed that the use of iron, such as $FeSO_4 \cdot 7H_2O$, as the source, alone or especially in combination with the continuous addition of oxygen, at low pH and high voltage in a pulsed streamer corona discharge procedure using very short pulse widths on the order of about 100–1000 ns is very effective in the degradation of organic contaminants. By low pH and high voltage, it refers to a pH of between about 2 and about 7, and preferably about 4, and a voltage of at least about 20 to about 45 kV or more, respectively. Nevertheless, any effective pH and voltage are contemplated by the methods of the present invention.

In runs involving the use of pulsed streamer corona discharge, where no oxygen is bubbled through the reactor, the organic contaminant (phenol) breakdown is independent of pH, thus indicating significant hydroxyl radical formation from the corona discharge. See FIGS. 4(a), (b) and (c). However, the presence of phosphate and borate buffers decreased the rate and magnitude of organic contaminant (phenol) breakdown at low and high pH, respectively, believed to be due to radical quenching. See FIG. 5(b).

Furthermore, the addition of oxygen in combination with the source or means like iron, such as $FeSO_4 \cdot 7H_2O$, or other equivalent compounds at preferably low pH, is found to significantly enhance organic contaminant (phenol) degradation even further. This may be due to the simultaneous occurrence of Fenton's and Hamilton's reactions induced by the corona discharge. When oxygen is continuously fed into the aqueous solution in a reactor, it is believed that two simultaneous reaction pathways contribute to organic contaminant (phenol) degradation. The first pathway consists of corona-induced aqueous phase reactions. The second pathway arises from ozone production in the gas phase with subsequent mass transfer into the liquid phase followed by liquid phase ozone reactions.

Figure 1A:
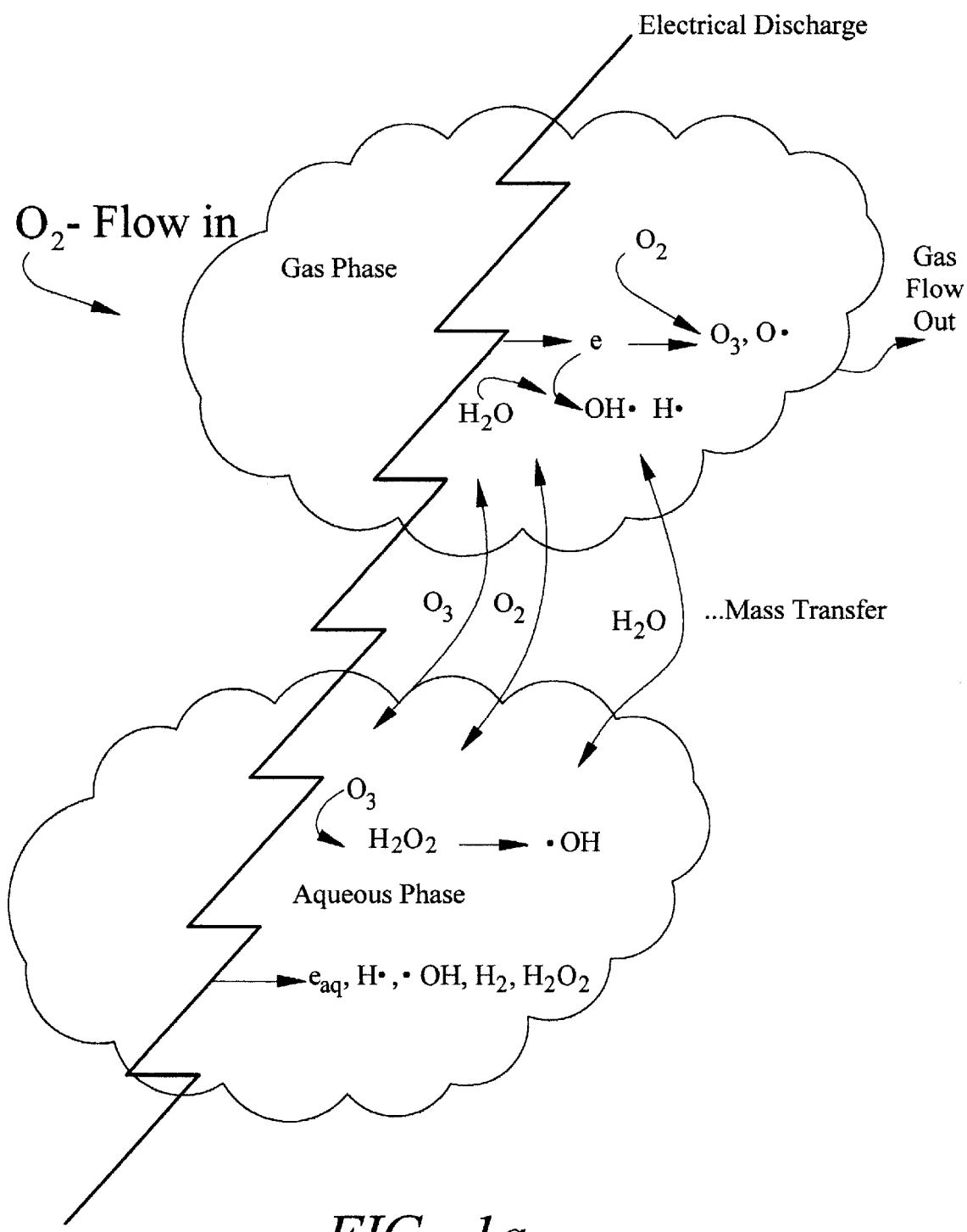

FIG. 1 shows certain of the features present in a gas/liquid pulsed streamer corona treatment process in accordance with this invention. It can be seen in FIG. 1 that in addition to the aqueous phase corona induced reactions, a number of gas and liquid reactions also occur when oxygen is continuously added to the system. As shown in FIG. 1, the ozone produced in the gas phase is transferred to the liquid phase through the gas/liquid interface. Once in the liquid, it is believed that the ozone leads to a number or reactions that will degrade the contaminants. In accordance with the present invention, these reactions are believed to contribute to the degradation of organic wastes.

It should of course be understood that the solution composition, pH, buffers, the addition of oxygen and the rate of oxygen flow or other sources capable of generating sufficient quantities of hydroxyl radicals from the $H_2O_2$ produced in the aqueous mediums by the corona induced reactions will all significantly impact upon the efficiency and effectiveness of the methods of the instant invention to breakdown the organic contaminants in the aqueous mediums.

It should also be appreciated that the sequence of adding or using the sources or means to facilitate the generation of hydroxyl radicals from the corona-produced $H_2O_2$ in the aqueous mediums may also impact upon the efficiency and effectiveness of the degradation of the organic contaminants. While the sources or means may be introduced or utilized at any point in the process, it is preferable to add or use the sources or means, especially if it is a compound, such as iron like $FeSO_4 \cdot 7H_2O$, or elemental iron prior to the start of the corona discharge procedure. Moreover, when iron is employed, it is preferable for the degradation process to proceed at a low pH and a high voltage as indicated above. When oxygen is also utilized, it is preferable to bubble the oxygen through the aqueous medium continuously throughout the corona process. Thus, it should be appreciated that the types of sources or means relied upon to enhance the generation of the hydroxyl radicals will assist in the determination at which point and how they should be added or used during the corona discharge processes.

In order to further illustrate the present invention and the advantages thereof, the following Example is given, it being understood that this Example is intended only to be an illustration without serving as a limitation on the scope of the present invention.

EXAMPLE

Figure 2:
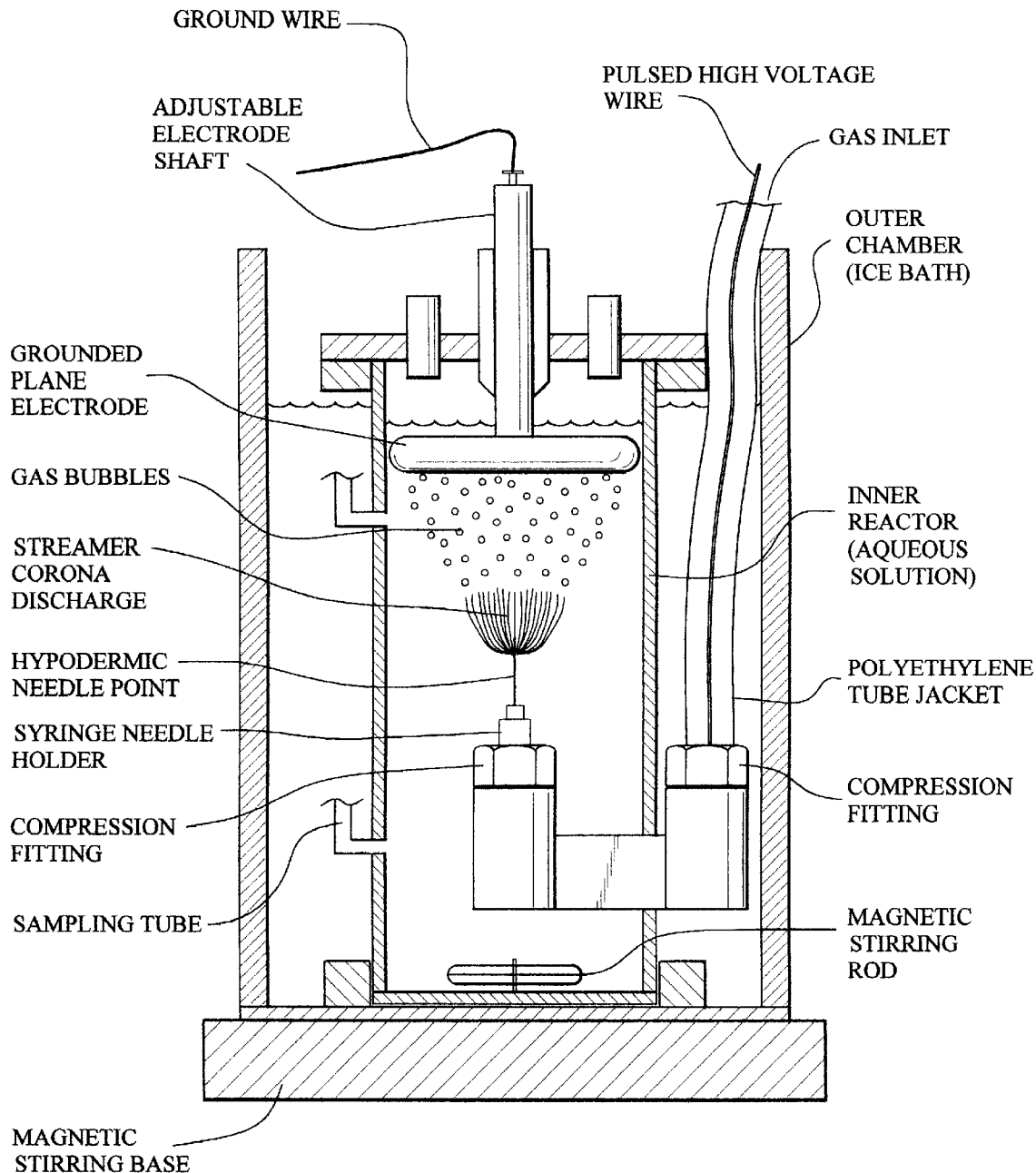
FIG. 2 is a schematic of a pulsed streamer corona aqueous solution reactor.

FIG. 2 shows a diagram of a reactor vessel used in accordance with the present invention. A cylindrical plexiglass tube capped on the bottom and having dimensions of about 5 cm inside diameter and about 19 cm high is used. The reactor vessel typically contains approximately 550 ml of solution and is submerged in an outer vessel containing an ice bath in order to keep the temperature constant (approximately 250° C.) during the runs. Pulsed streamer corona treatment of the liquid solution is provided by a high voltage discharge electrode in a point-to-plane geometry. The hollow hypodermic needle point electrode is located along the central axis of the cylindrical reactor approximately 5 cm above the bottom of the vessel. A stainless steel round plate ground electrode is placed at the top of the reactor opposite the needle discharge. Although the separation distance can be varied, a preferred point-to-plane distance is about 5 cm. A magnetic stirring rod at the bottom of the reactor provides good solution 'mixing in the reactor. A recirculation pump is connected to the reactor via two nylon fittings and ⅛ inch polyethylene tubing to allow for sample withdrawal. Typically, 5 ml samples are taken from the reactor vessel at about 20 minute intervals during the course of the runs. Temperature and pH are measured before and after each run. The solution is prepared by dissolving about 2.8–3.0 ml of about $0.5 \times 10^{-3}$ M phenol solution in 550 ml of deionized water. Temperature and pH are measured before and after each run. Thus, the final phenol concentration in the solution is about 1.00–1.25 mg/l. $FeSO4 \cdot 7H2O$ is added in two runs to give about $9.1 \times 10^{-4}$ and about $8.3 \times 10^{-4}$ M solutions.

Sample analysis is performed using a Perkin-Elmer HPI-C with a C-18 column and uv detection set at about 280 nm. Chromatography pump conditions of 1 ml/min and a carrier solvent of about 0.5% acetic acid and about 5.0% acetone are used. Sample analysis is performed immediately after removal from the reactor. Peak height on a chart recorder output from the HPLC is used to determine contaminant concentration after calibration with standard solutions.

Figure 3:
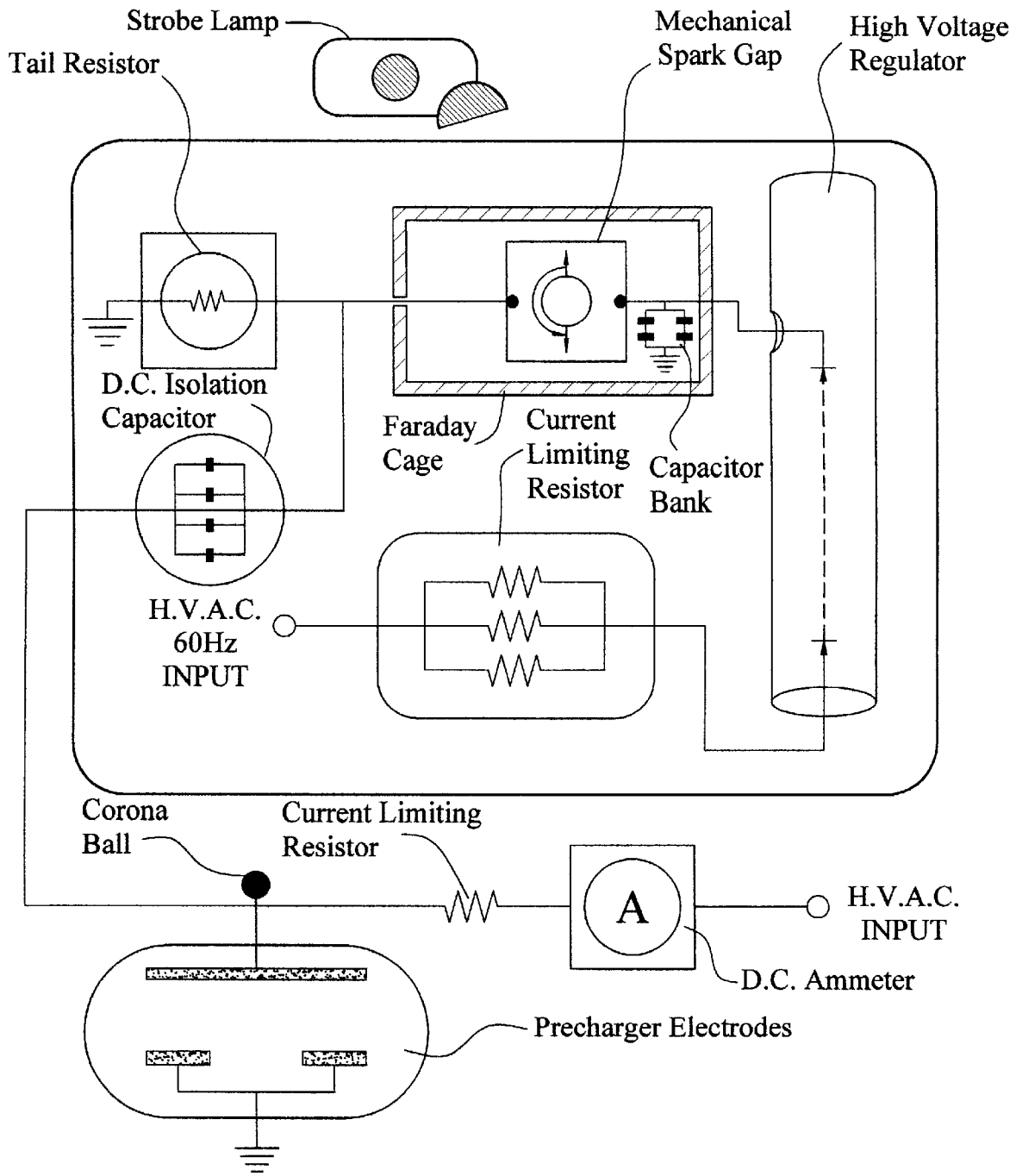
FIG. 3 illustrates a rotating spark gap power supply used to supply the pulsed voltage.

Pulsed energization of the high voltage discharge electrode is provided by a rotating spark gap power supply, FIG. 3, with a peak voltage (Vp) in the range of about 25–40 kV, pulse width of 500–1000 ns, pulse rise time of 20–100 ns, and a repetition frequency of 60 Hz. A dc bias voltage of 0–30 kV is available. The streamer corona propagates outward from the central discharge region located at the tip of the needle point. The fast-rising, short duration voltage pulses produce a very high localized electric field (~100 kv/cm) without sparkover. This results in the formation of more intense and uniform streamers. Positive polarity is believed to have an advantage over negative polarity in that the streamers are longer and cover a larger volume. A pulse voltage superimposed upon a small dc bias yields a higher peak voltage which further increases the streamer intensity but still avoids premature sparkover. All runs are run at about 30 keV.

FIGS. 4($a$), 4($b$) and 4($c$) show the breakdown of phenol for various conditions of pH and oxygen addition. At about pH 9.3, FIG. 4($c$), the control run with only $O_2$ and no discharge shows no phenol breakdown. Approximately 30% breakdown is achieved for all three pH values (3.98, 7.00, 9.32) after 80 minutes when no oxygen is added to the system. A comparison of the degradation of phenol indicates the following trends. All the runs with different pH (i.e., low pH, FIG. 4($a$), neutral pH, FIG. 4($b$), and high pH, FIG. 4($e$) show an approximately linear breakdown with time. Since these runs are performed without the addition of oxygen, it may be concluded in these runs that the degradation is believed to be only a corona discharge-driven process. These results suggest that the corona induced reactions play a considerable role in the degradation of organic molecules, such as phenol. Furthermore, since the runs are performed at different pH values, these results further suggest that the corona discharge-induced process is pH independent since there is essentially the same level of phenol breakdown at the different pH values.

The addition of oxygen to the reactor is believed to affect the degradation of phenol, as shown in FIGS. 4($a$), ($b$) and ($c$). In these experiments, the additon of oxygen at the rate of about 7.5 ml/min through the discharge needle removes phenol to below detectable limits within about 80 minutes for all pH values used. Furthermore, the results show that neutral or high pH values (i.e. pH=7.00 and pH=9.32 in FIGS. 4($b$) and 4($c$) speed up the dynamics of the degradation process more than at low pH. FIG. (4), pH=3.98. The level of conversion at half the run time (i.e. t=40 min) is about 90% for all pH values. If the time of the experiment is doubled, it is believed that the level reaches complete conversion. This result differs from the ones obtained without oxygen addition to the reactor and this suggests that the reactions controlling the phenol degradation process with and without the addition of oxygen are very different.

A dramatic increase in phenol degradation rate occurs upon the addition of iron to the reactor. The effect of iron addition with and without oxygen is shown in FIG. 5($a$). It can be seen that iron has a significant effect on the rate of phenol degradation. With oxygen bubbling through the discharge point, complete breakdown occurs in approximately 20 minutes, and without oxygen (pulsed streamer corona only) breakdown is complete in less than about 40 minutes. This is a significant enhancement compared to the runs when iron is not added to the reactor, as shown in FIGS. 4($a$), 4($b$) and 4($c$). However, the rapid increase in the reaction rate upon the addition of $FeSO_4 \cdot 7H_2O$ may be attributed to the presence of Fenton's reactions and Hamilton's reactions. When $Fe^{2+}$ reacts with $H_2O_2$, hydroxyl radicals are produced. This is known as Fenton's reaction, see, Sangster, D. F.: Free Radical and Electrophilic Hydroxylation, Chemistry of Hydroxyl group part-I, Interscience Publishers (Edited by Saul Fatal) (1971), and is given by $Fe^{2+}+H_2O_2 \rightarrow Fe^{3+}+OH-OH^-$.

The hydroxyl radical can again combine with $Fe^{3+}$ to produce hydroxide ion. In the presence of an organic compound, hydroxyl radicals are believed to prefer to react with organic compounds rather than $Fe^{3+}$. See, Swallow, A. l., Radiation Chemistry of Organic Compounds, Pergamon Press (1960). Hydroxyl radicals can directly attack phenol to produce hydroquinone and catechol. The catechol produced may further oxidize phenol by a Hamilton's type system, see Sangster, D. F.: Free Radical and Electrophilic Hydroxylation, Chemistry of Hydroxyl group part-I, Interscience Publishers (Edited by Saul Fatal) (1971). Hamilton's reactions requires $Fe^{3+}$, catechol, and $H_2O_2$. See, Sangster, D. F.: Free Radical and Electrophilic Hydroxylation, Chemistry of Hydroxyl group part-I, Interscience Publishers (Edited by Saul Fatal) (1971).

It is likely that Fenton's reactions as well as Hamilton's reactions are taking place in the streamer corona reactor when the methods of the instant invention are employed. The former will reinforce the latter since $Fe^{2+}$ is reduced to $Fe^{3+}$ in Fenton's reaction, and the $Fe^{3+}$ can combine with catechol to give rise to the Hamilton's reactions. It is important to note that the reagents are regenerated, i.e., iron and catechol act as catalysts.

It is well known that the irradiation of water produces $H^.$, $OH^.$, $H_3O^+$, $H_2O_2$, see, Sangster, D. F.: Free Radical and Electrophilic Hydroxylation, Chemistry of Hydroxyl group part-I, Interscience Publishers (Edited by Saul Fatal) (1971) and Hoigne, J.: Radiation for a Clean Environment, International Atomic Energy Agency, Vienna Austria, 219–232 (1975), and Hoigne, 1975, and that the role of the hydroxyl radical has been found to be effective in the removal of pollutants from aqueous solutions. See Hoigne, J.: Radiation for a Clean Environment, International Atomic Energy Agency, Vienna Austria, 219–232 (1975). The independence of reaction rate and extent of reaction on pH for the no oxygen-added runs suggests that hydroxyl radicals are formed directly from the pulsed streamer corona. Ozone is formed when oxygen is bubbled into the reactor with corona discharge. See, Clements, I. S. et al.: *IEEE Transactions Ind. Appl.*, IA-(23):224 (1987). The ozone formed in the gas phase will transfer into the liquid phase and may lead to the breakdown of the organic species. Direct attack of ozone may result in 1,3 cyclo addition. Ozone may also attack phenol indirectly via hydroxyl radical formation. In aqueous solution, ozone also reacts with water molecules to form hydrogen peroxide, which then decomposes to form hydroxyl radicals.

The decomposition of ozone is influenced by pH. See Hoigne, J.: Radiation for a Clean Environment, International Atomic Energy Agency, Vienna Austria, 219–232 (1975). At high pH, the ozone decomposition rate is very rapid while at low pH, ozone is fairly stable, therefore, more hydroxyl radicals are formed at high pH and the phenol breakdown rate would be faster than at low pH values. This is reflected in the data shown in FIGS. 4(*a*), 4(*b*) and 4(*c*). Since the aromatic nucleus of phenol is inert to addition reactions, the major pathway for phenol is not, in general, 1,3 dipolar cyclo-addition. It is instead believed to be indirect hydroxyl radical attack.

When the discharge is introduced into buffered solutions containing either phosphate buffers at low pH or borate buffers at high pH in accordance with the present invention, no significant breakdown of phenol is observed when no oxygen is bubbled into the reactor, see FIG. 5(*b*). This may be explained by the radical quenching effect of the buffer solutions that are used. The phosphate and borate buffers contain anions which are well known radical quenchers, see Hoigne et. al., 1985. The amount of hydroxyl radicals that are available for reaction with phenol are believed to be significantly lower, resulting in a smaller amount of breakdown.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced herein.

Having described our invention, we claim:

1. A method for oxidizing an organic contaminant in an aqueous medium, said method comprising:

generating $H_2O_2$ in the aqueous medium through the use of a corona discharge procedure;

generating a sufficient quantity of hydroxyl radicals from the $H_2O_2$ by means having the ability to facilitate the generation of the hydroxyl radicals; and oxidizing the organic contaminant in the aqueous medium by reacting the hydroxyl radicals with the organic contaminant.

2. A method of claim 1, the corona discharge procedure being a pulsed streamer corona discharge procedure.

3. A method of claim 1, the corona discharge procedure being conducted at a voltage of at least about $20_k V$.

4. A method of claim 2, the pulsed streamer corona discharge procedure being conducted at a voltage of at least about $20_k V$.

5. A method of claim 1, the means being a transition metal.

6. A method of claim 2, the means being a transition metal.

7. A method of claim 1, the means being a photo-catalyst.

8. A method of claim 7, the photo-catalyst being selected from the group consisting of titanium dioxide, silicon dioxide, cadmium sulfide, manganese oxide, magnesium oxide, lead oxide and zinc oxide.

9. A method of claim 1, the means being iron or elemental iron.

10. A method of claim 2, the means being iron or elemental iron.

11. A method of claim 1, the means being oxygen and a compound selected from the group consisting of a transition metal, elemental iron and photo-catalyst.

12. A method of claim 5, the aqueous medium having a pH of between about 2 and about 7.

13. A method of claim 6, the aqueous medium having a pH of between about 2 and about 7.

14. A method of claim 1, said method further including the step of adding oxygen to the aqueous medium.

15. A method of claim 2, the means being iron or elemental iron and including the step of adding oxygen to the aqueous medium.

16. A method of oxidizing organic contaminants present in an aqueous medium, said method comprising generating $H_2O_2$ by pulsed streamer corona discharge in the aqueous medium; and oxidizing the organic contaminants in the aqueous medium by reacting the organic contaminants with hydroxyl radicals generated from the $H_2O_2$ produced by the pulsed streamer corona discharge, said oxidation being enhanced by means, other than oxygen, which is capable of facilitating the generation of the hydroxyl radicals.

17. A method of claim 16, said method further including the step of adding oxygen to the aqueous medium.

18. A method of claim 16, the means being selected from the group consisting of transition metals, elemental iron and photo-catalyst.

19. A method of claim 16, the means being selected from the group consisting of manganese, copper, cobalt, uranium and rhenium.

20. A method of claim 16, the means being iron or elemental iron.

21. A method of claim 16, the means being selected from the group consisting of titanium dioxide, silicon dioxide, cadmium sulfide, manganese oxide, magnesium oxide, lead oxide and zinc oxide.

22. A method of claim 17, the means being iron or elemental iron.

23. A method of claim 17, the corona discharge being pulsed streamer corona discharge.

\* \* \* \* \*